Sept. 11, 1951 W. G. J. VAUGHN 2,567,499
FRAME CHANGING STRUCTURE IN PROJECTORS USING FILM STRIP
Filed Feb. 28, 1948 2 Sheets-Sheet 1

Inventor
William Griffith James Vaughn
by Sommers + Young
Attorneys

Sept. 11, 1951  W. G. J. VAUGHN  2,567,499
FRAME CHANGING STRUCTURE IN PROJECTORS USING FILM STRIP
Filed Feb. 28, 1948  2 Sheets-Sheet 2

Inventor
William Griffith James Vaughn
by Sommers & Young
Attorneys

Patented Sept. 11, 1951

2,567,499

UNITED STATES PATENT OFFICE 2,567,499

FRAME CHANGING STRUCTURE IN PROJECTORS USING FILM STRIP

William Griffith James Vaughn, Haslemere, England

Application February 28, 1948, Serial No. 11,953
In Great Britain, March 3, 1947

5 Claims. (Cl. 88—28)

This invention concerns improvements relating to the operation of optical projectors using film strip. Where projection is accompanied by a spoken or recorded commentary, it is necessary for the frames of the film strip to be changed at appropriate points in the progress of the commentary. It is an object of the invention to provide improved frame-changing apparatus which is particularly suitable for use where the film-feed is to be effected, automatically and in synchronism with the progress of a recorded commentary, in response to electric signals produced by or in synchronism with the recording.

A further object of the invention is to provide improved frame-changing apparatus which can be used with automatic frame-changing or for frame-changing under the control of a speaker who may be remote from the projector, direct manual operation at the projector being also provided for.

Figure 1:
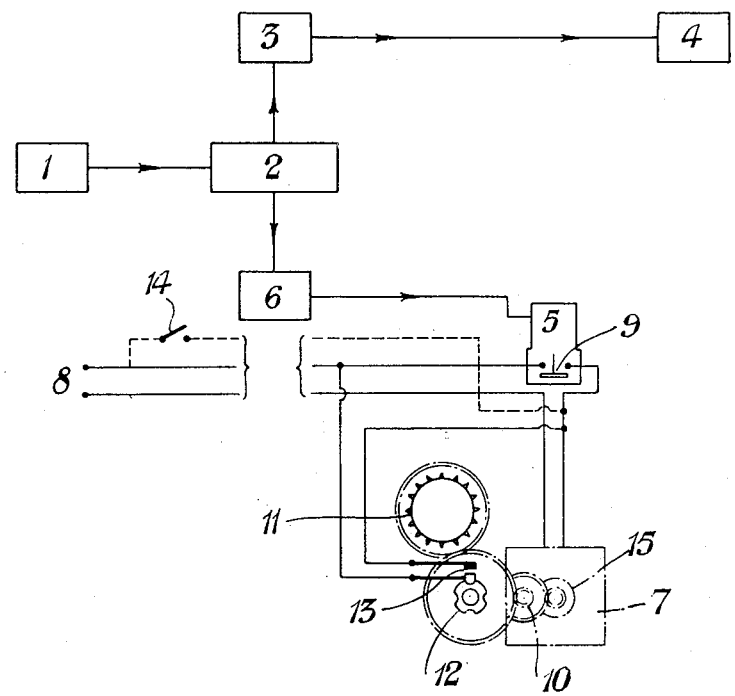
Figure 2:
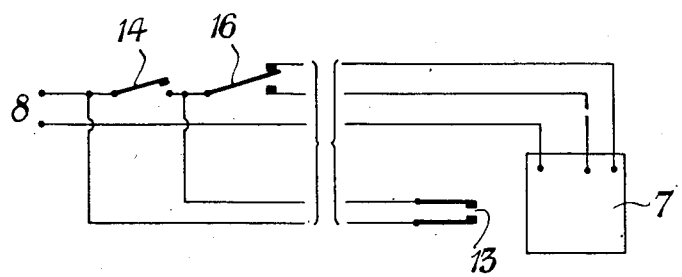
Figure 3:
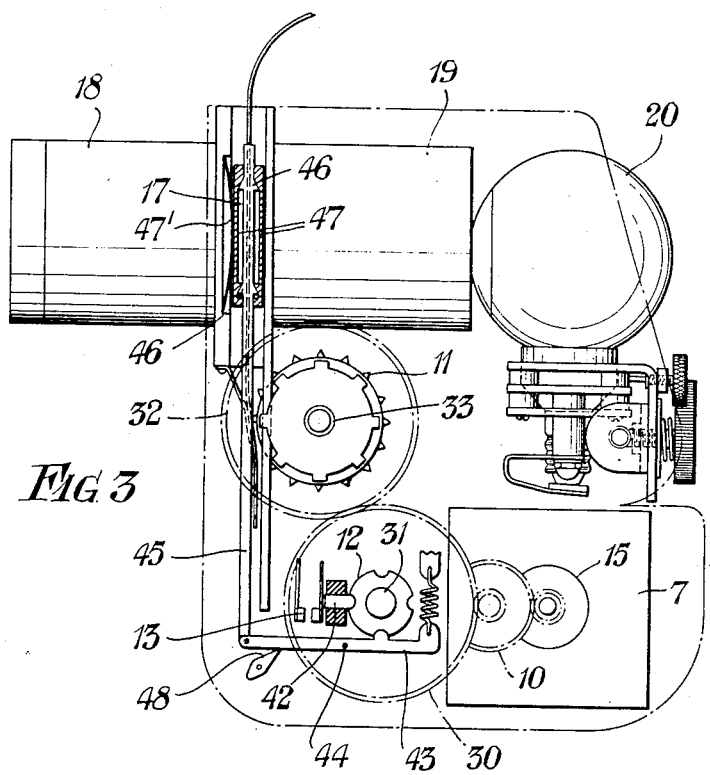

Various ways of carrying the invention into effect will now be described by way of example and with reference to the accompanying drawing in which:

Fig. 1 is a schematic diagram of apparatus,

Fig. 2 a cricuit diagram for a modification,

Fig. 3 a side elevation of a projector with one side of its casing removed, and

Figure 4:
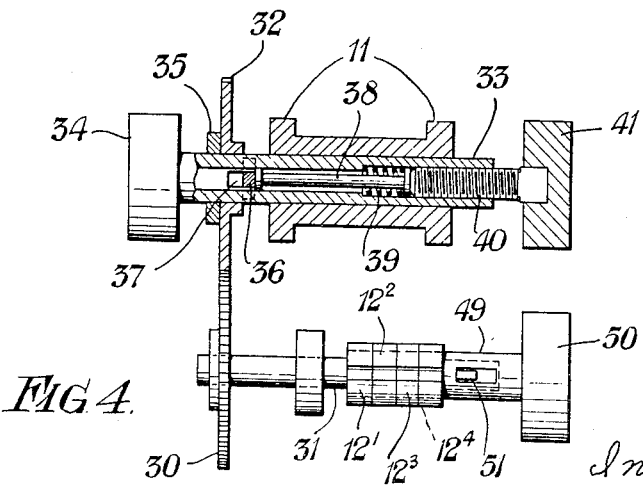

Fig. 4 a front elevation, partly in section, of the sprocket-driving means shown in Fig. 3.

In the arrangement illustrated in Fig. 1, the pick-up means 1 of a sound-reproducing device is connected to an amplifier 2 which is in turn connected through a rejector circuit or filter 3 to a loud-speaker 4. The amplifier is also connected to a thermionic relay or trigger device 5 through an acceptor circuit 6. The device 5 controls the connection of an electric motor 7, driving the film-feeding means of the projector, to a source of supply 8.

The record used may be of disc, cylinder, tape, magnetic wire, film or other type. During the original recording of the commentary, the speaker will have under his control a recordable signal, for example of sine-wave form, which is recorded together with the commentary at the points where a change of frame is required. The frequency of this signal, unless supersonic, is preferably selected so that its omission from subsequent reproduction will be of little consequence to the quality of the sound. Only a short pulse of the signal need be recorded and the audio-frequency oscillator or other signal-producing device may be designed to give a pulse of precisely predetermined duration.

The rejector circuit 3 is designed in known manner to prevent the signal from reaching the loud-speaker 4 and thus becoming audible. If audibility is not objected to, the circuit 3 may be dispensed with. The acceptor circuit 6, which may be situated at any suitable point beyond the pick-up means 1, can be designed to resonate at the signal frequency and, possibly, to reject other frequencies. The relay device 5, when actuated by a signal, operates an electro-magnetic relay which closes the circuit of the motor 7 at contacts 9. As hereinafter described, the motor drives, through reduction gearing 10, film-feeding sprockets 11 and a cam 12 controlling contacts 13 in parallel with the contacts 9. The contacts 13 are normally open when the motor is at rest, but are closed immediately the motor commences to run and held closed to maintain a hold-on circuit for the motor until the film has been advanced by one frame, whereupon they are allowed to open and the motor is disconnected from the supply, the contacts 9 being already open.

The duration of the signal should be no longer than is necessary to start the motor 7 and close the contacts 13. Otherwise there might be a danger of the film being advanced by more than one frame. To avoid this danger even if the signals recorded are of indefinite duration, the electromagnetic relay of the device 5 may be designed to close the motor circuit for a predetermined short period in response to each signal regardless of its length. For example, a solenoid-type relay may be arranged so to close the motor circuit by causing the passage over a fixed contact of one of a series of segmental contacts carried by a wheel which is rotated by the armature of the relay through a pawl and ratchet. Alternatively, the same object could be achieved in known manner by a combination of relays or in the electronic device 5 itself.

To permit use of the apparatus in cases where there is no recorded commentary and the speaker speaks directly, or through the amplifier 2 and loud speaker 4, the abovedescribed arrangement may be designed so that the automatic control can be cut out when required. A switch 14 in the supply circuit of the motor may be arranged near the speaker who can thus himself effect the frame changing by remote manual control. An operator can similarly effect the frame-changing in the case of the use of a recorded commentary without frame-changing signals. Only a brief closure of the switch 14 is necessary to ensure the completion of the frame-changing cycle. If desired, the switch 14 may comprise a push-button operating rotary contacts through a pawl and ratchet in the manner and for the purpose described above in connection with the relay. Indeed the switch and relay could be combined. Instead of applying the remote control to the motor circuit itself, however, control could be exercised through the relay device 5 or a separate relay.

In some cases, it may be sufficient to provide for remote control only.

Suitably, use is made of a known type of shaded-pole motor with a built-in clutch 15 which operates automatically to disconnect the motor armature from the reduction gearing 10 directly the motor circuit is opened. This permits of the instantaneous stopping of the sprockets with the frame in its correct position at the gate. The motor may be reversable and in this case a reversing switch 16, conveniently arranged near the switch 14, may be included in the control circuit, for example as shown in Fig. 2. If the switch 14 is held closed with the switch 16 in the position for reverse rotation, it is possible to rewind the film strip back to its initial position.

Fig. 3 illustrates the general arrangement of a preferred form of projector. The gate 17 lies between the projection and condenser lens systems 18, 19, behind which is a fully adjustable lamp 20. A gear wheel 30 on the cam shaft 31 meshes with a similar wheel 32 which is free on the sprocket shaft 33, but can be clutched thereto as hereinafter described. The sprockets 11 and a knob 34 (Fig. 4), by which the said sprockets can be turned by hand, are fast on the shaft 33. The gear wheel 32 can be gripped against a collar 35 fast on the said shaft by a shoe 36 guided in slots 37 therein and engageable by a rod 38 which is normally held away from the said shoe by a spring 39, but can be forced into engagement with it by a spindle 40 screwed in the shaft 32 and provided with a knob 41. If preferred, the knob 41 could be arranged on the same side as the knob 34, the positions of the collar 35 and shoe 36 being transposed.

When the sprockets are to be driven by the motor, the clutch device is engaged to couple the gear wheel 32 to the shaft 33. The clutch can also be engaged when it is desired to effect frame-changing by hand, as this will enable a "stop" to be found for each frame position due to the action of the cam 12. The motor supply would be switched off for such manual operation. The clutch is disengaged when it is desired to adjust the frame correctly in the projection gate. The film strip can thus be adjusted without disturbing the position of the cam 12 and thereby closing the motor circuit at the contacts 13. After the first frame has been thus adjusted, following frames advanced by motor or hand operation will be automatically positioned correctly at the gate.

If the projector is required to handle one frame size only, for example the "single" size (24 x 18 mm.), a single cam 12 will suffice. If the diameter of the sprockets 11 is such that one quarter revolution of the shafts 31, 33 will advance the film by one frame, the cam 12 will have four troughs and four crests. In addition to controlling the contacts 13 through an insulated plunger 42 (Fig. 3), the cam 12 preferably also operates a spring-loaded movement-multiplying lever 43 which is pivoted at 44 and connected to a push-rod 45 provided with wedges 46 adapted for separating slightly two spring-loaded pressure plates 47 while the film is being advanced. These plates comprise frames containing glasses between which the film is held under pressure as shown by a leaf spring $47^1$, while it is stationary in the gate. The actions controlled by the cam can be variously effected: Thus the contacts 13 and the push rod 45 could be arranged to be actuated by separate cams, or the contacts could be actuated by a projection on the lever 43 or the push rod 45 actuated by cam surfaces provided on the plunger 42, extended and additionally spring loaded for the purpose. To enable the pressure of the plates 47 to be relieved while film is entered into the gate 17 or advanced manually by the knob 34, a small lever 48 is provided by which the rod 45 can be raised manually. If one pressure plate 47 is arranged to be swung away with the projection lens system in known manner, the lever 48 will not be needed. The abovedescribed arrangements are effective for both directions of movement of the film through the gate.

If the projector is required to project also "double-frame" pictures (24 x 36 mm.), one half revolution of the shafts 31, 33 will be necessary for each frame change. This calls for a cam with only two crests and troughs. To permit of easy change over, a four-crest cam $12^1$ and a two-crest cam $12^2$ are slidably mounted upon the shaft 31 so that either can be brought into operative relation with the contact-operating means. For this purpose the cams are fixed upon a sleeve 49 provided with a knob 50 and slidably engaged with the shaft 31 by a key 51. If separate similar cams $12^3$, $12^4$ are employed for actuating the push rod 45, these also are arranged on the sleeve 49, so that the single knob 50 can serve for changing over both the contact cams $12^1$, $12^2$ and the pressure-relieving cams $12^3$, $12^4$.

Automatic frame-changing apparatus similar to that described above can be readily applied to known projectors, so that a standard projector can be converted into an automatically controlled projector. In this case, the existing film-feeding means of the projector, for example the sprocket shaft would be coupled to a motor-driven shaft, similar to the cam shaft 31, by a releasable coupling, preferably a coupling which is disengageable from both shafts, so that the film strip can be correctly positioned in the gate by hand without disturbing the cam-shaft 31.

As already indicated, automatic frame-changing may be controlled in various ways. Instead of recording a signal of short duration at each point where a frame-change is required, a continuous signal recorded with the commentary could be interrupted for a given short interval at each such point. In this case, the relay device 5 would be designed to respond to the interruption of the signal, the apparatus being otherwise the same. Alternatively, no separate signal is employed and the relay device is designed to respond to an abnormal drop in the output voltage of the commentary recording itself. The speaker would record his commentary without undue pauses between words except at the frame-changing points where he would pause for a given interval sufficient to cause the necessary drop of voltage on reproduction of the recording. Finally, frame changes may be produced by mechanically actuated contact means, especially in the case of disc records. For instance, the drive for the turntable of the reproduction device may be arranged to operate a series of adjustable contacts or contact-actuating stops by means of a lead screw.

The contacts would be arranged to be operated at the times changes of frames are required according to a key which may be given on the record. The contacts may complete the motor circuit for a short interval either directly or through a relay. The signal acceptor circuit would not be used, but the arrangement should be such as to avoid excessively long closure of the motor circuit, for example by means such as have been described. Instead of the lead-screw, an extension on the pick-up arm may be arranged to travel over a series of adjustable contacts or contact-operating stops having the function explained above.

Whatever the mode of control of the frame changing, the projector may be arranged for either front or rear projection. The loud speaker may be disposed where most convenient, but will commonly be either behind or near the screen. For rear-projection, the screen, projector and loud-speaker may be assembled as a unit which is connected by cable to the amplifier and pick-up arrangement. For front projection, the amplifier and the pick-up arrangement may be assembled as a unit together with the projector.

Two or more projectors can be connected for parallel synchronised control from one point. Thus a single source of sound, whether recorded or spoken, may serve more than one viewing point, for example overflow lecture rooms. Projectors, with or without sound-reproducing means, can be controlled over considerable distances by land line or by wireless. In either of the latter cases, the frame changing may be controlled by a signal transmitted with the sound.

The projector may be designed so that it can be separated from the rest of the apparatus and used independently. The projector may also be used for the automatic showing of pictures, for example for advertising, the motor-control switch being actuated by a switch or relay timed to operate at the intervals at which the pictures are to be changed. With a disc record, the pick-up means may be caused in known manner to repeat the reproduction of the disc in synchronism with pictures carried on the film strip, possibly an endless strip.

I claim:

1. In combination with a film-strip projector comprising a film gate and projection means, frame changing apparatus comprising a reversible electric motor, a cam shaft connected to the motor through a transmission including an automatic clutch, which disengages directly the motor is deenergized, and reduction gearing, a sprocket shaft carrying a film-feeding sprocket located near the gate and means whereby the said shaft can be turned by hand, a driving means loose on the sprocket shaft, a driving means in engagement with the said driving means and fast on the cam shaft, a manually operable clutch for connecting the former drive means to the shaft, an energizing circuit for the motor, contacts closeable for completing the said circuit, contacts closeable for holding the said circuit closed, contact-actuating means including a cam on the cam shaft for closing the second-named contacts while the motor drives the film-feeding sprockets to advance one frame through the gate and then opening the said contacts, and a remote-control reversing switch whereby the energizing circuit can be completed for either forward or reverse running of the motor.

2. The combination, according to claim 1 and including pressure plates acting upon the film strip at the gate and means for relieving the pressure during film feed comprising a cam on the motor-driven cam shaft carrying the contact-operating cam.

3. In combination with a film-strip projector comprising a film gate and projection means, frame changing apparatus comprising a reversible electric motor, a cam shaft connected to the motor through a transmission including an automatic clutch, which disengages directly the motor is de-energized, and reduction gearing, a film-feeding shaft carrying a film-feeding element located near the gate and means whereby the said feeding shaft can be turned by hand, a driving means loose on the said feeding shaft, a driving means in engagement with the said driving means and fast on the cam shaft, a manually operable clutch for connecting the former driving means to the film-feeding shaft, an energizing circuit for the motor, contacts closeable for completing the said circuit, contacts closeable for holding the said circuit closed, contact-actuating means including a cam on the cam shaft for closing the second-named contacts while the motor drives the film-feeding shaft to advance one frame through the gate and then opening the said contacts, and a remote-control reversing switch whereby the energizing circuit can be completed for either forward or reverse running of the motor.

4. The combination, according to claim 3 and including pressure plates acting upon the film strip at the gate and means for relieving the pressure during film feed comprising a cam on the cam shaft.

5. In combination with a film-strip projector comprising a film gate and projection means, frame changing apparatus comprising an electric motor, a cam shaft connected to the motor through a transmission including an automatic clutch, which disengages directly the motor is de-energized, a film-feeding shaft carrying a film-feeding element located near the gate and means whereby the said shaft can be turned by hand, a manually operable clutch engageable between the film-feeding shaft and the cam shaft for coupling the former to the latter, an energizing circuit for the motor, contacts closeable for completing the said circuit, contacts closeable for holding the said circuit closed, and contact-actuating means including a cam on the cam shaft for closing the second-named contacts while the motor drives the film-feeding shaft to advance one frame through the gate and then opening the said contacts.

WILLIAM GRIFFITH JAMES VAUGHN.

REFERENCES CITED

The following references are of record in the file of this patent:

UNITED STATES PATENTS

| Number | Name | Date |
|---|---|---|
| 1,166,120 | Fox | Dec. 28, 1915 |
| 1,199,506 | Stavehagen | Sept. 26, 1916 |
| 1,692,703 | Rigolage | Nov. 20, 1928 |
| 2,038,976 | Wood et al. | Apr. 28, 1936 |
| 2,088,516 | Grier | July 27, 1937 |
| 2,116,314 | Jenkins et al. | May 3, 1938 |
| 2,136,209 | Finch | Nov. 8, 1938 |
| 2,231,765 | Landrock | Feb. 11, 1941 |
| 2,279,119 | Freimann | Apr. 7, 1942 |
| 2,281,943 | Loughner et al. | May 5, 1942 |
| 2,299,973 | Getten | Oct. 27, 1942 |